Dec. 27, 1960  R. D. JOHNSON  2,966,260
PACKAGING FOR LIFT TRUCK HANDLING
Filed Jan. 23, 1959  2 Sheets-Sheet 1
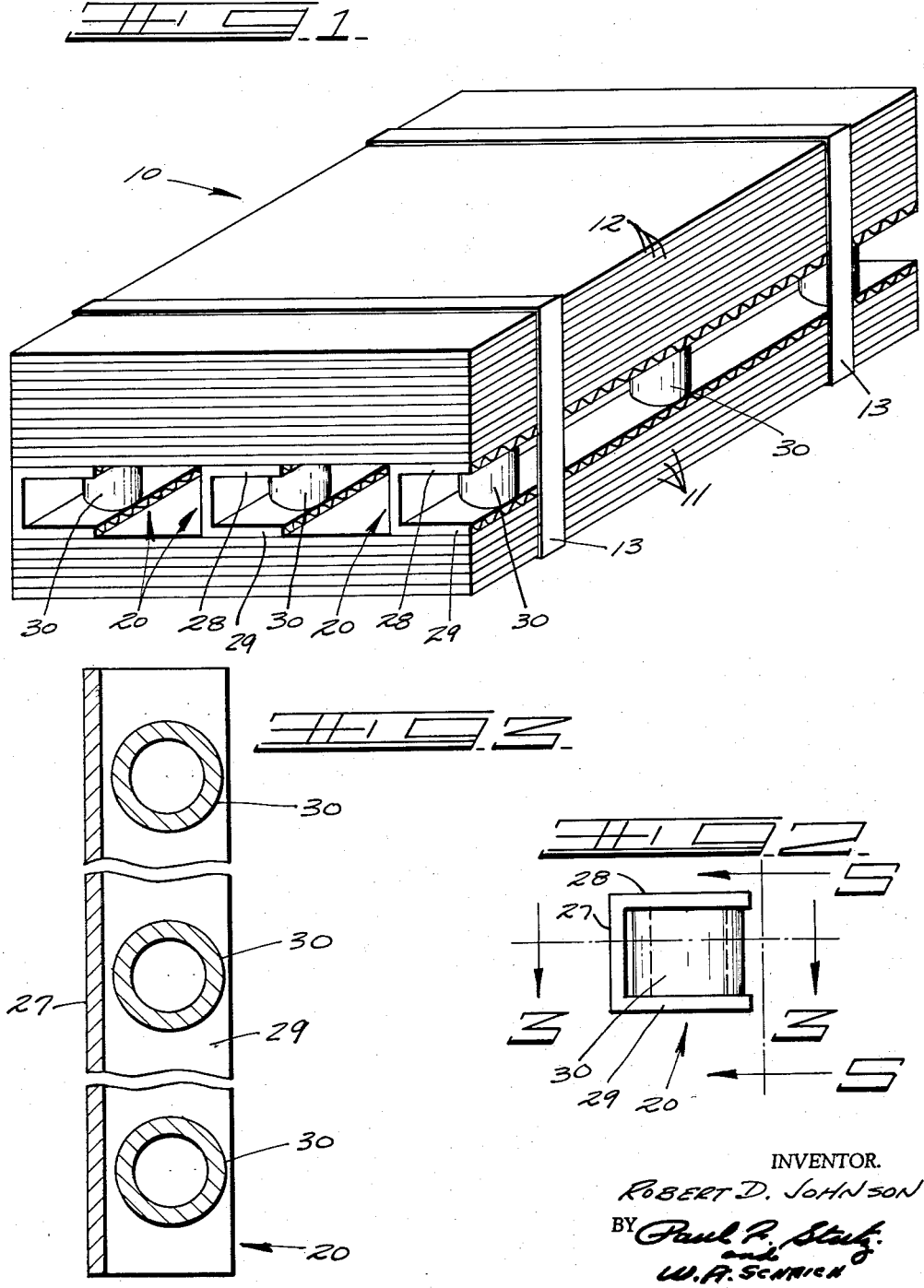
INVENTOR.
ROBERT D. JOHNSON
BY
ATTORNEYS Dec. 27, 1960  R. D. JOHNSON  2,966,260
PACKAGING FOR LIFT TRUCK HANDLING
Filed Jan. 23, 1959  2 Sheets-Sheet 2
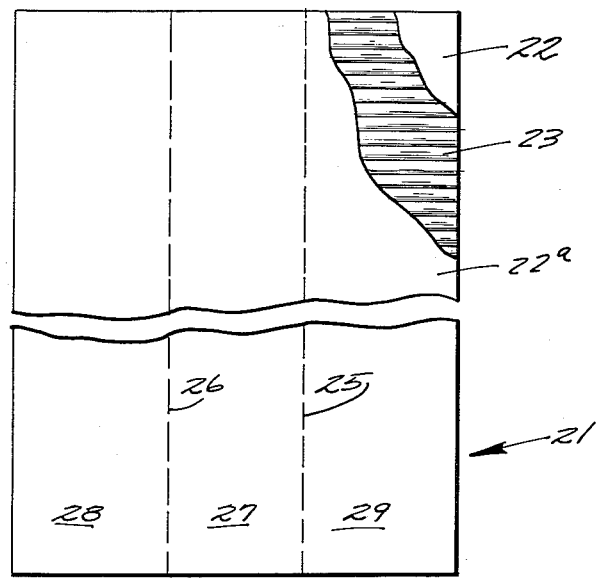
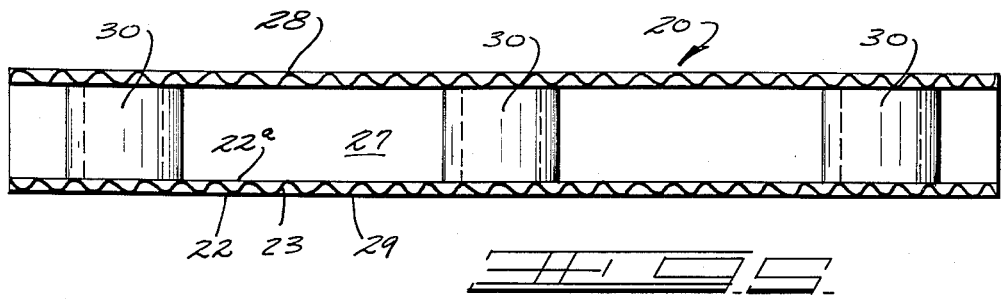
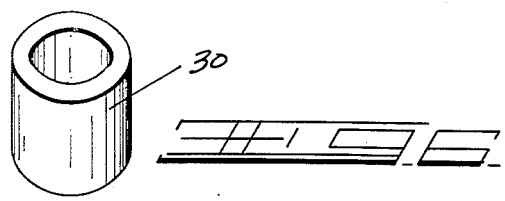
INVENTOR:
ROBERT D. JOHNSON
BY
ATTORNEYS

United States Patent Office 2,966,260
Patented Dec. 27, 1960

2,966,260

PACKAGING FOR LIFT TRUCK HANDLING

Robert D. Johnson, Sylvania, Ohio, assignor to Owens-Illinois Glass Company, a corporation of Ohio Filed Jan. 23, 1959, Ser. No. 788,572

2 Claims. (Cl. 206—60)

The present invention relates to a scheme for forming a unitized load of articles for shipping purposes. More particularly, the present invention relates to a novel spacing member, several of which are used in preparing or assembling a unitized load of articles.

By the term "unitized load" is meant a singular, integrally bound plurality of articles which are capable of being handled by power lifting and transporting equipment such as a fork or lift truck. This is also frequently called "palletized loading" due to the fact that a pallet arrangement is included in the load.

Conventional wooden pallets, of course, have been used for many years. These pallets are generally manufactured of wood or metal and consist of an elevated platform which was capable of receiving a plurality of vertically stacked articles. The platform is elevated by runner members defining passageways into which the driver of a lift truck or the operator of a hand-operated lift truck may insert the forks thereof for lifting and moving of the pallet and the articles stacked thereon from place to place.

This scheme of loading has several disadvantages. In the first place, of course, the pallet was fairly heavy and was relatively expensive. In addition, each location or station from the producer to the place of final use of the articles was required to maintain a supply of such wooden pallets for utilization in the material-handling function. Furthermore, articles placed thereon frequently tumble from the pallet in the moving process and have to be restacked. To overcome certain of these disadvantages there was developed the concept of the unitized load. In this concept, the plurality of articles and a pallet were integrally bound together by steel strapping or the like, with the consequence that the pallet was an integral part of the package and stayed with the articles from the manufacturer to the final retail outlet or to the intermediate processor who was involved in utilizing the products contained thereon. With this concept, there developed the scheme of utilizing a less expensive material of construction than wood or metal. A likely candidate material was paper, which is light-weight and, therefore, less expensive to ship, and, in addition, is inexpensive, as one-trip use was an accompanying feature of the unitized load concept. Conventionally, pallet constructions utilizing paper as the material of construction, such as corrugated board and the like, followed generally similar designs to those of the forerunner pallets manufactured of wood and steel. Thus, the pallet generally assumed the form of a platform member having an area of the desired size, and, depending therebeneath, a plurality of spacing blocks or members to provide passageway for receiving the forks of a lift truck beneath the load. In general appearance, they resembled the older wooden pallets. The components thereof were either stapled or glued together. As a consequence, the paperboard pallet, although appreciably lighter in weight than the older pallet constructions were, nonetheless, bulky and cumbersome. As a consequence, mutilation and destruction frequently occur when one man attempts to handle these bulky pallets fabricated of paperboard components. Furthermore, the manufacturers are still required to allot a certain amount of space for storage of these bulky pallets prior to their assembly into a unitized load.

Accordingly, it is an object of the present invention to provide an improved unitized loading arrangement.

It is a principal object of this invention to provide compact lightweight yet strong spacing members which may be used in constructing a unitized load.

It is an additional object of the present invention to provide such a compact spacing member which is of simple design and economical construction.

The above and other objects of the present invention will become apparent to those skilled in the art from the following detailed description, taken in conjunction with the annexed sheets of drawings, on which there is presented for purposes of illustration only, a single embodiment of the invention.

In the drawings:

Fig. 1 is a perspective view of a unitized load incorporating the spacing members of this invention.

Fig. 2 is an end-on view of a linear spacing member assembly.

Fig. 3 is a sectional view in plan taken on the line 3—3 of Fig. 2.

Fig. 4 is a plan view of a knock-down blank used in forming one component of the spacer member assembly, and in which portions are shown broken away.

Fig. 5 is a side elevation view taken on the line 5—5 of Fig. 2.

Fig. 6 is a perspective view of a hollow, cylindrical, paperboard tube constituting an element of the spacer assembly of the invention.

The assembly of the present invention finds its greatest utility in the formation of a unitized load of generally flat articles such as sheet material, e.g., box blanks of paperboard or corrugated board, wall board, plastic sheets and the like.

Basically, the present invention envisions a spacing member, several of which will be used in stacking a plurality of sheet-like items such as box blanks and the like, each spacing member being composed of a channel-like member and a plurality of spaced tubes affixed to and between horizontally disposed parallel legs of the channel so that the members, when disposed in a stack of articles, locate the axis of the tube normal to the vertical height of the stack.

The invention will now be more particularly described with reference to the drawings, in which the same elements and parts in the several figures will be identified by the same reference numeral.

In Fig. 1, a complete assembly 10 of a unitized load is shown as composed of a plurality of horizontally disposed, vertically stacked sheets 11, forming a bottom layer, three channel-like spacing members 20, another plurality of horizontally disposed, vertically stacked sheets 12, forming an upper layer, and the entire unit bound by a pair of encircling straps 13. The spacing members 20 are formed of a rectangular piece of corrugated board as shown in blank form in Fig. 4, and three hollow cylinder paperboard members, as illustrated in Fig. 6. A piece of corrugated board in Fig. 4 identified by the numeral 21 is composed of a lower sheet of kraft paper 22, having adhesively secured to one side a piece of corrugated or fluting medium 23 which, in turn, has adhesively secured to the flutes on the opposite side, another sheet of liner board 22a. The board, as shown, is generally rectangular, and is provided with a pair of parallel, spaced score lines 25, 26 in parallel relationship with the longest dimension of the rectangular piece of board. The score lines divide the rectangular board into a central panel 27 and wing panels 28 and 29. The piece of board, as defined, can be assembled by folding about the score lines 25, 26 to bring the wing panel 28 and the wing panel 29 into parallel relationship, and with both normal to the central panel 27.

The paperboard tube 30 of hollow, cylindrical configuration may be formed by winding a plurality of sheets of kraft liner board in spiral fashion about a mandrel until the desired thickness is obtained. This, of course, will vary, depending upon the load which the ultimate spacer member will be exposed to. For purchasers of paper roll stock, it is found most convenient to use the hollow, cylindrical tubes fabricated of paperboard, which are used as cores in the shipping of roll stock. Thus, when the roll stock has been used, the cylindrical cores may be conveniently sawed into lengths and used to manufacture the spacer member. The height of the tube 30 must, of course, be the same as the width of the central panel 27. Two or more of these tubes are placed in spaced relationship on, for instance, the wing panel or leg member 29, and affixed thereto by stapling or use of an adhesive. If an adhesive is used, of course, the facing rim should be smooth to provide the greatest area of contact with the panel 29. Next, the member 21 is folded about the score lines as indicated hereinabove to bring the panel 28 into abutting relationship with the other end of the paper board tube, and affixed thereto by stapling or adhesive. The number of tubes used in forming the spacing member will vary, depending upon the load involved in the ultimate unitized load. As shown in the drawings, there have been utilized three such tubes which, when assembled in the manner illustrated, yield a spacing member as shown in Figs. 2, 3, and 4. As can be seen by reference to these figures, the spacing member is compact and can be stored with a minimum of space utilization.

When it is desired to assemble or erect a unitized load, a plurality of articles, which in the illustrated drawings constitute sheet material, can be laid flat on the floor atop a plurality of spaced straps. Next, a plurality of the spacing members 20 can be positioned thereon in a manner similar to that illustrated in Fig. 1. Following this, another stack of the sheets can be placed on top of the spacing members, following which the ends of the straps can be brought together and tightened to yield an integrally bound, unitized load which incorporates spacer members of the invention, and which defines therebetween passageway to accommodate entry of the parallel forks of a lift truck. The spacer members may, of course, be located as to constitute the bottom of the unitized load, if it would be undesirable to have the sheet-like materials contact the floor, which may be dirty, damp, or otherwise deleterious to the articles. In this regard, however, it will be noted that the layer of sheet material just above the wing member 28 and the sheet just below the wing member 29 serve almost as platforms and permit a more advantageous ultimate unitized load. Accordingly, a construction which utilizes a spacing member between or at an intermediate level such as illustrated in Fig. 1 is preferred.

Preferably, the channel-like member 21 is so scored that the corrugations run across the width of the respective panels thereof. In this fashion, the central panel 27, which is vertical in the preferred assembly, will have the corrugations therein perpendicular to resist the load bearing down from above. In this regard, it is noted that the construction in this fashion permits cooperation between the hollow, cylindrical member 30 and the channel-like member 21. Thus, the cylindrical tubes in and of themselves are resistant to compression. Their utility in this regard is enhanced by their physical mounting in the channel members as shown. Thus, there is added to the compressive strength the strength of the central panel 27. In addition, the combination of the hollow, cylindrical tube 30 and the channel member affords a greater latitude in the dimension of the cylindrical tube. Thus, it is apparent that utilization of cylindrical tubes alone is limited by the inherent limitations of the cylindrical tube. In other words, if the height of the cylindrical tube is greater than its diameter, it is relatively unstable and subject to toppling. In the spacer assembly of the invention, however, the cylindrical tube 30 has its ends affixed to the inner surfaces of an integral channel-like member, and, consequently, the stability of the tube is enhanced. Accordingly, one constructing the spacer assembly is not bound by the inherent limitations, and accordingly, may utilize a cylindrical tube of greater height than diameter without fear of increasing the instability problem. This, of course, permits the passageway between the spaced linear members 20, as viewed in Fig. 1, to be of greater height, and, therefore, accommodate with greater ease the forks of a lift truck.

Modifications may be resorted to within the spirit and scope of this invention.

I claim:

1. A unitized load comprising in combination, a vertical stack of horizontally disposed sheet-like articles divided into upper and lower portions by a plurality of elongated spacer members disposed in parallel spaced relationship between the bottom sheet-like article of the upper stack portion and the top sheet-like article of the lower stack portion, whereby the said bottom and top sheet-like articles serve as platforms and support, respectively, the upper stack portion and the spacer members, each spacer member being of channel-shaped cross-section and having a vertical panel, vertically spaced horizontal wing panels, and a plurality of vertically disposed supports between said wing panels; and a plurality of circumferentially extending straps which bind the stack into a unitary construction containing, between said spacer members, openings for lift truck forks.

2. A package of sheet-like articles comprising in combination two vertical stacks of horizontally disposed sheet-like articles, one stack overlying the other in spaced relationship; a plurality of spacers in parallel spaced relationship located between said stacks whereby the sheet-like article just above the spacers and the sheet-like article just below the spacers serve as platforms and support, respectively, the upper stack and the spacers; each of said spacers comprising a channel-like member having a vertical central panel and equal horizontal wing panels, said wing panels being in parallel relationship and embracing a plurality of hollow tubes disposed normal to said wing panels; and a plurality of straps which bind said stacks and spacers into a unitary package containing, between said spacers, openings for lift truck forks.

References Cited in the file of this patent

UNITED STATES PATENTS

| | | |
|---|---|---|
| 2,559,930 | Bolton et al. | July 10, 1951 |
| 2,611,569 | Coleman et al. | Sept. 23, 1952 |
| 2,778,491 | Taylor et al. | Jan. 22, 1957 |